United States Patent
Kottke et al.

(10) Patent No.: US 6,511,044 B2
(45) Date of Patent: Jan. 28, 2003

(54) METHOD FOR ADJUSTING THE IDLE POSITION OF A THROTTLE PULL

(75) Inventors: Joachim Kottke, Remseck (DE); Martin Wöhrle, Berglen (DE); Friedel Kordowich, Stuttgart (DE); Reinhard Friedrich, Waiblingen (DE)

(73) Assignee: Andreas Stihl AG & Co., Waiblingen (DE)

( * ) Notice: Subject to any disclaimer, the term of this patent is extended or adjusted under 35 U.S.C. 154(b) by 133 days.

(21) Appl. No.: 09/798,950

(22) Filed: Mar. 6, 2001

(65) Prior Publication Data

US 2001/0019118 A1 Sep. 6, 2001

(30) Foreign Application Priority Data

Mar. 6, 2000 (DE) .......................................... 100 10 869

(51) Int. Cl.$^7$ ............................................... F16K 31/44
(52) U.S. Cl. ..................................... 251/294; 74/500.5
(58) Field of Search ................... 251/294, 77; 74/500.5

(56) References Cited

U.S. PATENT DOCUMENTS

| 4,798,185 A | | 1/1989 | Driggers | |
| 5,000,059 A | * | 3/1991 | Barnard | 74/473.15 |
| 5,165,298 A | * | 11/1992 | Shier et al. | 74/500.5 |
| 5,685,271 A | * | 11/1997 | Taomo et al. | 74/500.5 |
| 5,727,425 A | * | 3/1998 | Lee | 74/500.5 |
| 5,842,277 A | | 12/1998 | Häberlein et al. | |
| 5,865,155 A | * | 2/1999 | Nagashima | 74/500.5 |
| 5,868,377 A | * | 2/1999 | Taomo et al. | 251/294 |
| 5,871,202 A | * | 2/1999 | Taomo et al. | 251/294 |
| 5,913,946 A | * | 6/1999 | Ewing | 74/500.5 |

* cited by examiner

Primary Examiner—Henry C. Yuen
Assistant Examiner—John Bastianelli
(74) Attorney, Agent, or Firm—Walter Ottesen

(57) ABSTRACT

The invention relates to a portable handheld work apparatus having a movable control element (1) for influencing the operation of the work apparatus. The work apparatus includes an actuable positioning element (2) and a Bowden cable (3) connecting the positioning element (2) and the control element (1). The Bowden cable (3) includes a Bowden cable casing (4) and a wire (5) guided in the casing (4) so as to be axially movable. The Bowden cable casing (4) is held at its two ends (6, 7) in support locations (8, 9) with respective longitudinal stops (10, 11). The support locations (8, 9) are fixed with respect to the apparatus. An adjusting device (12) is provided between the ends (6, 7) of the Bowden cable sleeve (4) and the corresponding support locations (8, 9). The adjusting device (12) has a holding element (14) which holds the end (6, 7) and is fixed to the support location. The holding element (14) can be loosened to axially displace the ends (6, 7).

7 Claims, 6 Drawing Sheets

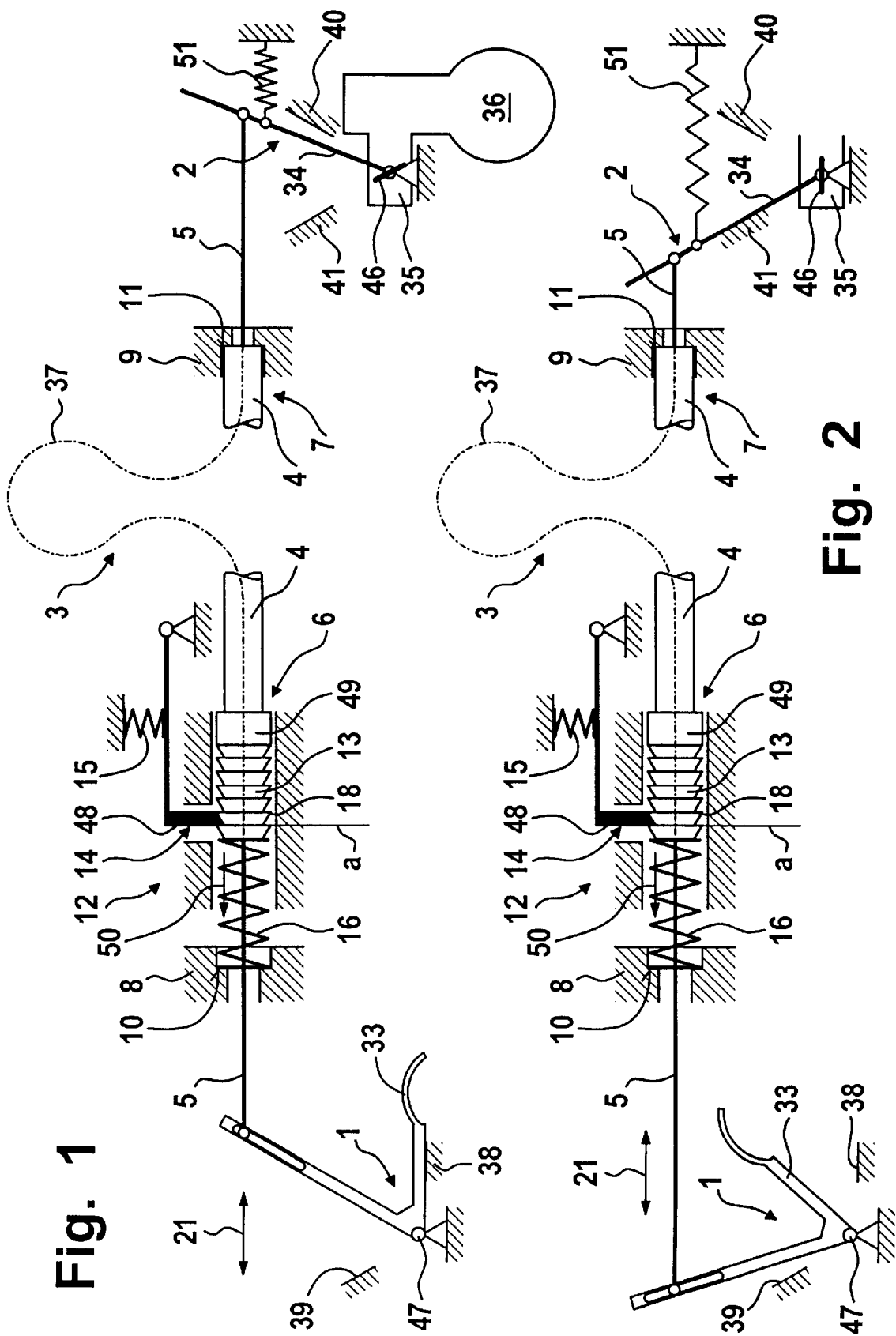

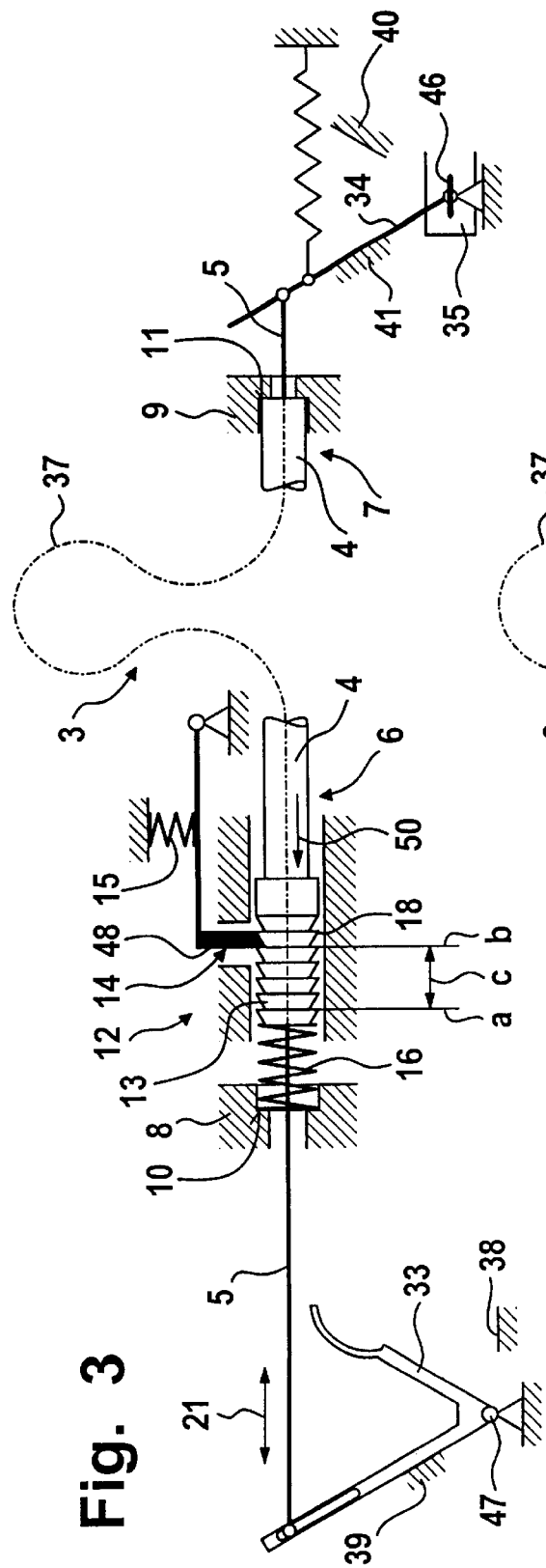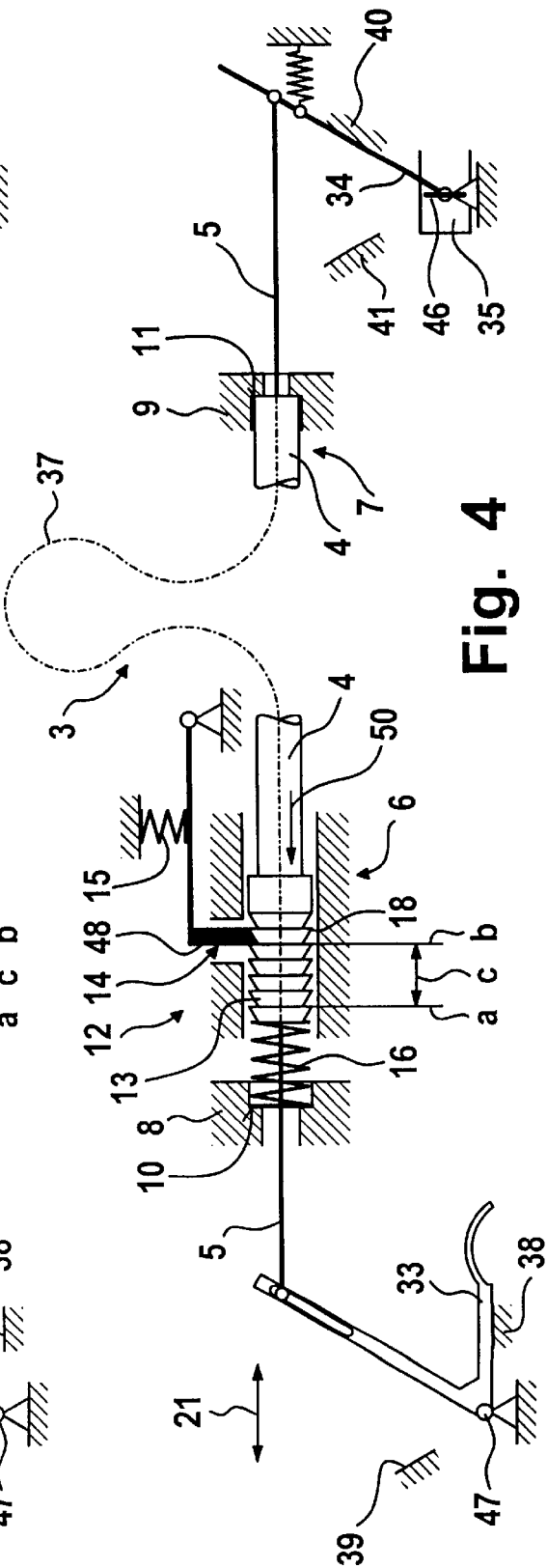

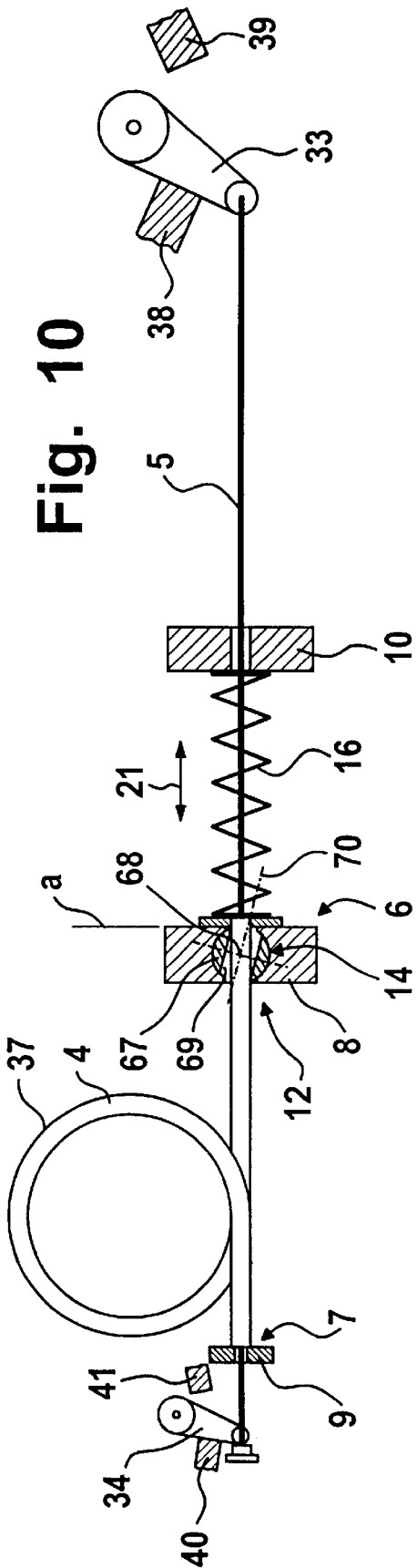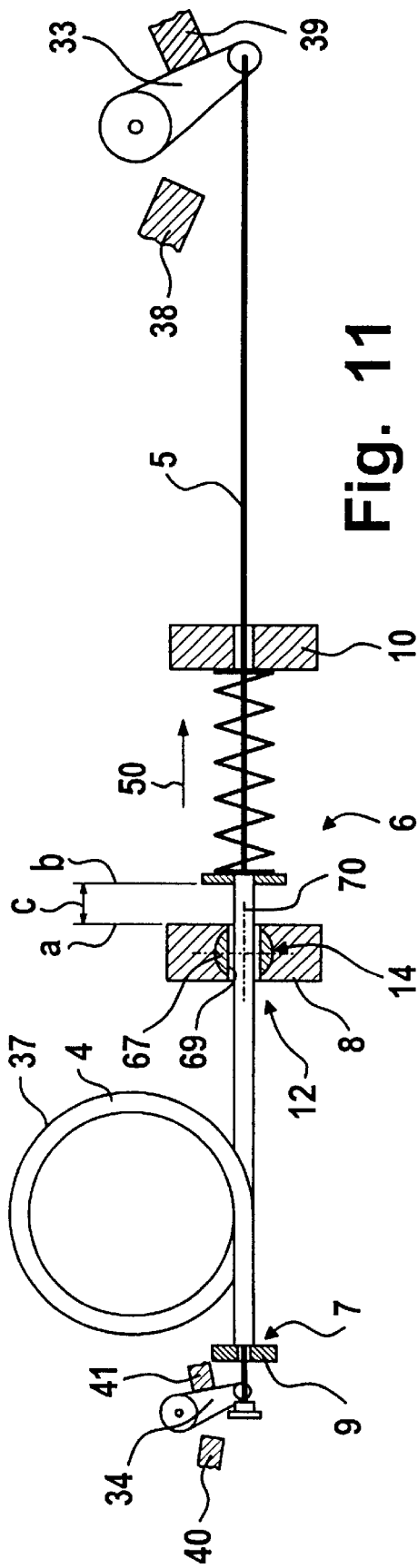

METHOD FOR ADJUSTING THE IDLE POSITION OF A THROTTLE PULL

BACKGROUND OF THE INVENTION

Work apparatus are known whose operation can be influenced by a movable control element via a Bowden cable and an actuable positioning element. The carburetor of an internal combustion engine, which is used as a drive motor of a brushcutter, is controlled via a Bowden cable as a throttle cable. The throttle flap lever of the carburetor is actuable via the Bowden cable wire by a movable throttle lever which is mounted in a handle of the brushcutter. The pivotal region of the throttle flap lever is limited by an idle stop and full-throttle stop. The pivot region of the throttle lever is then greater than that of the throttle flap lever. For this reason, the adjustment must be so matched that the full throttle position of the throttle flap lever corresponds to the full throttle position of the throttle lever.

If the Bowden cable placement is changed, then the adjustment must be newly adapted. Wear and extreme temperatures can also lead to a lengthening of the Bowden cable and change the matching. Then, the throttle flap of the carburetor can still be in part load, for example, in the idle position of the throttle lever and this could lead to excessive engine speed at idle. The situation can also occur that, for full throttle of the throttle lever, the throttle flap is not completely opened and therefore the engine cannot develop its full power.

In a brushcutter, the throttle lever is integrated into a handle of the steering bar. If the position of the steering bar is changed, then the positioning of the Bowden cable is changed. The adjustment is then to be renewed which is especially difficult outdoors and a smooth work sequence is hindered.

An imprecisely adjusted Bowden cable can lead to considerable start problems. If the start throttle position of the throttle flap is determined by latching of the throttle lever in a start position, an imprecisely adjusted Bowden cable leads to an incorrect throttle flap position. For an opening of the throttle flap which is too narrow, the mixture becomes rich and the engine becomes flooded. For a throttle flap opening which is too wide, the mixture becomes lean and no ignitable mixture results in the combustion chamber.

SUMMARY OF THE INVENTION

It is an object of the invention to provide a method for making a precise position adjustment of the Bowden cable available between a throttle lever and throttle flap lever.

The method of the invention is for adjusting the idle position of a throttle pull of a portable handheld work apparatus driven by an internal combustion engine having a carburetor, the carburetor having a throttle lever and a throttle flap lever, the throttle pull including a Bowden cable having a cable casing and a cable wire axially guided and axially movable in the cable casing, and the Bowden cable connecting the throttle lever and the throttle flap lever to each other, the throttle lever being movable between a first idle stop and a first full throttle stop and the throttle flap lever also being movable between a second idle stop and a second full throttle stop; and, the throttle pull further including an adjusting device mounted on an apparatus-fixed support location and having a holding element. The method includes the steps of: moving the throttle flap lever in a direction of full throttle utilizing the throttle lever until one of the levers comes into contact with the full throttle stop corresponding thereto; loosening an existing connection between the holding element of the adjusting device and one of the two ends of the cable casing; axially shifting the one end of the cable casing relative to the holding element so far that the throttle lever and the throttle flap lever come into contact engagement with the first and second full throttle stops, respectively; reestablishing the connection between the holding element and the one end of the cable casing; moving the throttle lever so far in a direction toward the first idle stop so that the throttle flap lever comes into contact engagement with the second idle stop; and, moving the throttle lever through a lost motion distance to the first idle stop.

An adjusting device is arranged in the region of one end of the Bowden cable casing between this end and the support location supporting the end fixedly on the apparatus. The adjusting device includes a holding element secured tightly to the support location. This holding element holds one end of the Bowden cable casing under operating conditions. The connection between the holding element and the Bowden cable casing is releasable to adjust the Bowden cable. The end of the Bowden cable casing cannot be displaced axially in the loosened condition. With the axial displaceability, the effect is utilized that a tension load on the Bowden wire for a Bowden cable placed so as to form an arch leads to a pressure loading between the ends of the Bowden cable casing and the particular support positions fixed to the apparatus.

If the Bowden cable is unadjusted so that the throttle flap lever lies at its full throttle stop before the throttle lever has reached its full throttle stop, a corresponding force acts between the Bowden cable end and the holder element. When loosening the connection between the holder element and the end of the Bowden cable casing, the Bowden cable casing displaces itself automatically in the axial direction until the throttle lever also lies against its full throttle stop. In an advantageous configuration, a pressure spring between the longitudinal stop and the corresponding end of the Bowden cable casing prevents an excessive slippage of the end through the holder element. Thereafter, the connection between the holder element and the Bowden cable casing can again be reestablished. After this procedure, the full throttle position of the throttle flap lever is adjusted to the full throttle position of the throttle lever. In the opposite direction, in the idle position of the throttle flap, the end of the Bowden cable wire, which is hooked into the throttle flap lever, can freely displace axially so that the throttle lever can likewise move back to its idle stop. When opening the throttle, only the lost motion of the Bowden cable wire at the throttle flap lever is to be first overcome.

In a preferred embodiment, the adjusting device comprises a latch element, which is secured on the Bowden cable, a holding element fixed to the support location as well as a spring element. The spring element presses the latch element and the holder element together under a pretension so that the holder element engages in the latch element and holds the latch element with a preadjusted holding force.

For a suitable adjustment of the pretension force of the spring element, the holding force between the latch element and the holder element is sufficient to take up the pressure forces at the end of the Bowden cable casing. These pressure forces result from a usual operating load on the Bowden cable wire. However, if, for example, the throttle flap lever lies against its full throttle stop before the throttle lever has reached its full throttle stop, then an additional manual force can be applied to the throttle lever by the operator. With this additional manual force, the holding force of the adjusting device is overcome whereby the throttle lever can likewise be brought into its full throttle position. At the same time, the latch element shifts relative to the holder element into a new latch position wherein the latch element is axially fixed by the holder element. To increase the holding force in the adjusting device, it can be advantageous to mount a pressure spring in the region of the adjusting device between the longitudinal stop and the corresponding end of the Bowden cable casing. In a preferred embodiment, the adjusting device is provided in the region of the control element because here more structural space is present and therefore also an improved access possibility to the adjusting device.

Preferably, the holding element includes a toothed element having a plurality of teeth, which engage in a corresponding counterset of teeth of the latch element. With this arrangement, and for a high holding force, the teeth can be small and arranged closely one next to the other whereby the adjusting operation can take place in fine steps. For this, the latching element is advantageously configured shorter than the holding element and has a fewer number of teeth than the holding element so that the latch element is completely in engagement with the holding element over a long adjusting path. An approximately symmetrical flank form of the teeth can be advantageous. A flank angle of the teeth of less than 90° has been shown to be advantageous. When there is an exchange of the Bowden cable, the latch element is released and is pushed in the direction of idle. After seating the new Bowden cable, the throttle lever is brought into the full throttle position in accordance with the above-described procedure and the latch element of the adjusting device is shifted into the new end position thereby. In this way, a precise positioning of the throttle flap is then ensured for the start position.

In an advantageous embodiment of the invention, the holder element is formed by a tube-shaped guide box in which the latch element is guided. A rack is mounted on the inner wall of the box having teeth which mesh with corresponding counterteeth of the latch element lying thereagainst. On the side of the latch element facing away from the rack, a pretensioned spring element is mounted within the box between the corresponding wall thereof and the latch element. This spring element presses the latch element with its counterteeth into the teeth of the rack. To reduce the structural space, the spring element is configured as a leaf spring and is held form tight to reduce the complexity of assembly. The leaf spring has holding angles at the ends thereof which engage about both ends of the latch element. Because of the holding angles, a form tight connected unit is formed comprising the leaf spring and the latch element so that the leaf spring can be moved together with the latch element during the adjustment operation. In this way, a constant applied force is ensured independently of the latch position of the latch element.

A work tool opening is provided in the toothed wall of the box for unlatching the latch device. With the work tool, for example, a screwdriver, a pressure can be applied which works against the pretensioning force of the spring element and, as a consequence thereof, the latch element no longer meshes with the rack and can be manually adjusted. The unit comprising the latch element and the spring element is advantageously configured so as to be mirror symmetrical whereby a tilting is avoided when pressure is applied with the work tool to unlatch the latch element from the rack.

BRIEF DESCRIPTION OF THE DRAWINGS

The invention will now be described with reference to the drawings wherein:

FIG. 1 is a schematic showing an arrangement between a control element of a carburetor control in the unadjusted position for th case of idle;

FIG. 2 corresponds to FIG. 1 but shows the unadjusted set position for the case of full throttle of the throttle flap;

FIG. 3 corresponds to FIG. 1 and shows the adjusted set position for the case of full throttle of the throttle flap and the full throttle position of the control element;

FIG. 4 corresponds to FIG. 1 but in the adjusted set position in the case of idle for the throttle flap;

FIG. 10 is a schematic showing the arrangement with a clampable adjusting device in the unadjusted set position in the case of idle;

FIG. 11 corresponds to FIG. 10 showing the adjusted set position in the case of full throttle; and, FIG. 12 is a work apparatus in accordance with the invention shown as exemplary for a brushcutter.

DESCRIPTION OF THE PREFERRED EMBODIMENTS OF THE INVENTION

Figure 12:
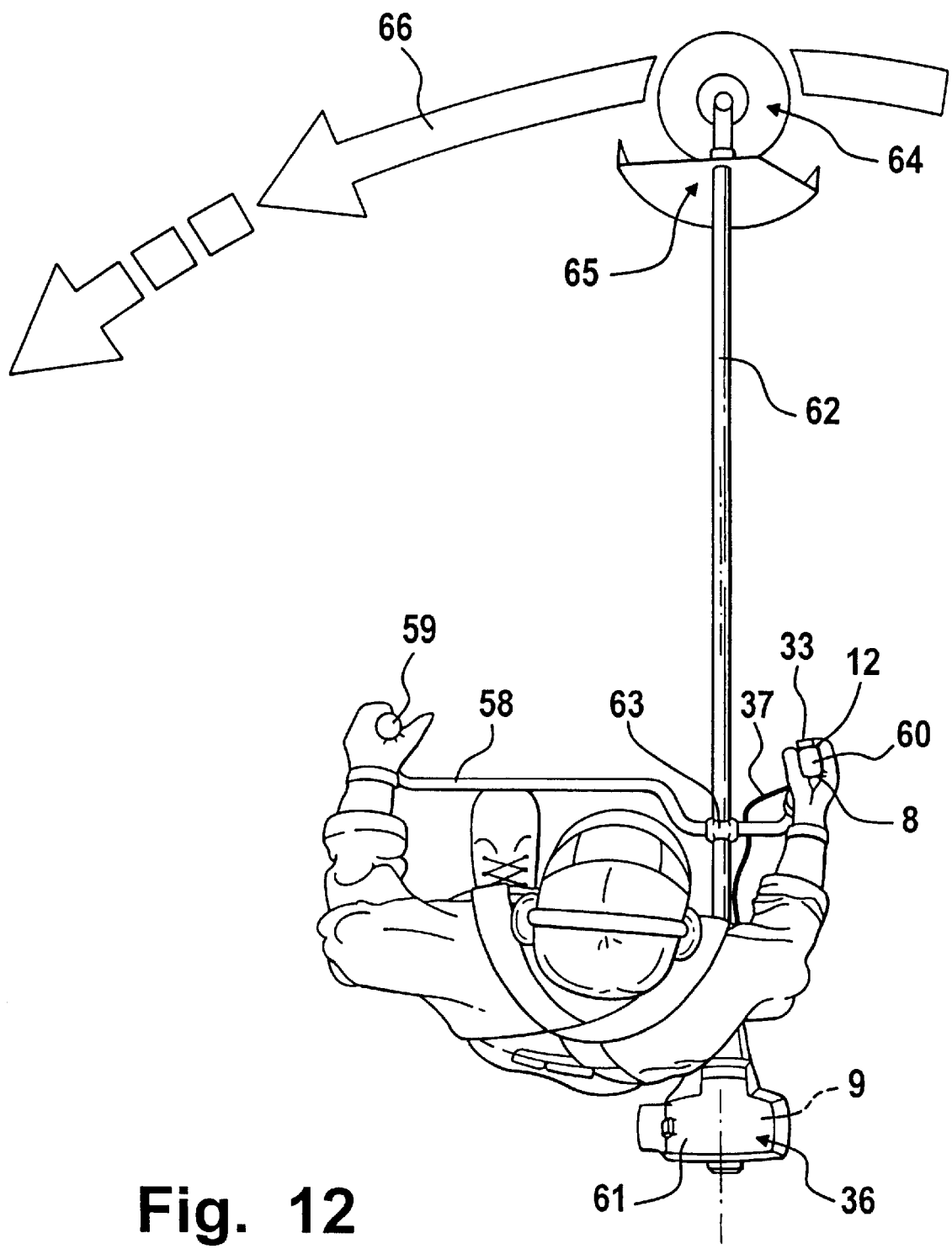

In the arrangement shown schematically in FIG. 1, an internal combustion engine 36 is provided for driving a work apparatus shown in greater detail in FIG. 12. A carburetor 35 having a throttle flap 46 for power control is mounted on the engine 36 to supply the engine with an air/fuel mixture. The throttle flap 46 is movable via a throttle flap lever 34 between an idle position and a full throttle position. The idle position is defined by the idle stop 40 and the full throttle position is defined by the full throttle stop 41 of the throttle flap lever 34. The adjusting element 2 in the form of a throttle flap lever 34 is actuable via the Bowden cable 3 and the movable positioning element 1 in the form of a throttle lever 33. The Bowden cable 3 defines the throttle pull 37.

The throttle lever 33 lies against its idle stop 38 in the idle position. The actuation path of the throttle lever 33 pivots about the bearing position 47 and is limited by the full throttle stop 39. The Bowden cable 3 includes a Bowden cable casing 4 and a wire 5 guided so as to be axially movable in the casing 4. The Bowden cable casing 4 is held at its two ends (6, 7) in mounting positions (8, 9) having respective longitudinal stops (10, 11). The wire 5 connects the throttle lever 33 to the throttle flap lever 34 and is movable in the axial direction 21 in the region of the control element end 6. The axial direction is shown by double arrow 21.

An adjusting device 12 is provided between the control element end 6 of the Bowden cable casing 4 and the control element support position 8. The adjusting device includes a latch element 13, a holding element 14 and a spring element 15. It can also be practical to mount the adjusting device 12 in the region of the positioning element end 7. The holding element 14 is in the form of a pawl 48 and engages in a ramp-shaped counterteeth configuration 18. This counterteeth configuration 18 is formed as an end sleeve 49 of the Bowden cable casing 4 and is connected thereto at the control element end 6.

The control element end 6 is held with a defined holding force, which acts in the direction of the arrow 50, because of the pretension force of the spring element 15 and the one-sided bevel of the pawl 48 as well as the counterteeth configuration 18. The holding force is supported by a pressure spring 16 between the control element end longitudinal stop 10 and the end 6. When the holding force is exceeded, the latching element 13 is latchingly movable relative to the holding element 14. The latching element 13 is held tight by the pawl 48 in the direction opposite to the arrow 50. However, by lifting the pawl 48, the latch element 13 can be unlatched against the pressure force of the spring 15 and be moved in a direction of double arrow 21 for manual adjustment.

In the arrangement shown, the throttle flap lever 34 is out-of-adjustment with respect to the throttle lever 33. The pawl 48 engages in the countertooth configuration 18 in an out-of-adjustment position (a). As a consequence thereof, the throttle lever 33 lies against the idle stop 38 while the throttle flap lever 34 is at a spacing relative to its idle stop 40. In this way, the throttle flap 46 has a part-load position in the carburetor 35 and, as a consequence thereof, the engine 36 runs up in an unwanted manner.

The throttle lever 33 is movable in a direction of the full throttle stop 39 by applying a manual force thereto. As shown in FIG. 2, the throttle flap lever 34 is brought into contact engagement with the full throttle stop 41 thereof via the wire 5 and the throttle flap 46 is thereby brought into the full throttle position. The manual force applied to the throttle lever 33 corresponds to the friction forces in the Bowden cable 3 which are to be overcome and the return force developed by the throttle flap spring 51. The holding force of the adjusting device 12 is so dimensioned by the configuration of the spring element 15 and the pressure spring 16 that the holding force is not overcome by the manual force on the throttle lever 33 which is necessary for actuating the throttle flap. As a consequence, the pawl 48 remains in the out-of-adjustment position (a) (FIG. 2) until the throttle flap lever reaches its full throttle stop 41. In this position, the throttle lever 33 is, however, spaced to the throttle stop 39.

FIG. 3 shows that the holding force of the adjusting device 12 can be overcome by the application of an additional manual force to the gas lever 33 and, as a consequence thereof, the throttle lever 33 can be placed against the full throttle stop 39. In connection therewith, the control element end 6 of the Bowden cable casing 4 together with the latch element 13 carries out a latching movement along the holding element 14 in the direction of the longitudinal stop 10. The latching element 13 is mounted on the Bowden cable casing 4. In this position, the pawl 48 meshes with the counterteeth configuration 18 in an adjusted position (b) and the latching element 13 has passed through an adjusting path (c). In this way, both the throttle lever 33 as well as the throttle flap lever 34 lie against their respective full throttle stops (39, 41).

FIG. 4 shows the arrangement of FIG. 3 in the idle position. Because of the engagement of the holding element 14 in the adjusted position (b) on the latching element 13, the Bowden cable 3 is so adjusted that, for the shown contact engagement of the throttle lever 33 against its idle stop 38, the throttle flap lever 34 is also in contact engagement with its idle stop 40. In this way, the throttle flap 46 is also at the desired idle position.

Figure 5:
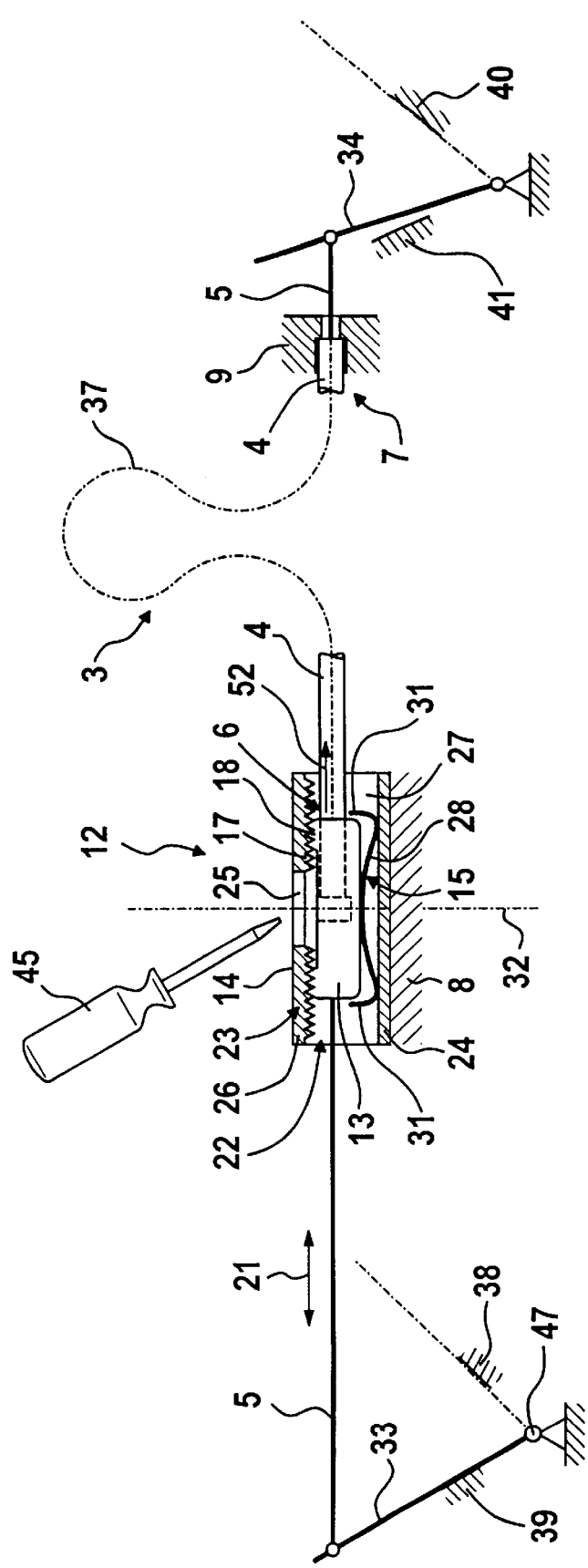
FIG. 5 is a view of a configuration of an adjusting device for an arrangement of FIG. 1.

FIG. 5 shows a detail view wherein the holding element 14 is in the form of an elongated tube-shaped guide box made of polypropylene. A latching element 13 made of polyamide is accommodated on the inner side of the box 22. An inner wall 23 of the box 22 includes a toothed configuration 17 which is shown in meshing engagement with the countertooth configuration 18 of the latching element 13. A spring element 15 in the form of leaf spring 28 is arranged between the wall 24 lying opposite to the toothed inner wall 23 and the latching element 13. The leaf spring 28 is held form tight in the axial direction 21 on the latching element 13 by two holding angles 31. The unit comprising the spring element 15 and the latching element 13 is configured to be mirror symmetrical to a plane 32 lying perpendicular to the axial direction 21. Perpendicular to the axial direction 21, the spring element 15 is held form tight at one end by the latching element 13 and, on the other end, by the wall 24. A tool opening 25 is provided on the side of the toothed inner wall 23 in the guide box 22 for unlatching the adjusting device 12.

In the arrangement shown, the throttle lever 33 lies against the full throttle stop 39; whereas, the throttle flap lever 34 is spaced to its full throttle stop 41. In this way, the engine (FIG. 1) does not reach the maximum power notwithstanding the full throttle position of the throttle lever 33. A corresponding adjustment can be undertaken in that, with a screwdriver 45 or like tool, a force is applied to the latching element 13 through the tool opening 25 with this force acting against the pretension force of the spring element. As a consequence of this, the two teeth configurations (17, 18) are no longer in meshing engagement with each other and the latching element 13 can be moved in a direction of arrow 52 relative to the holding element 14. Preferably, the relative movement of the latching element 13 is in the direction of arrow 52 beyond the point at which the throttle flap lever 34 comes in contact engagement with the full throttle stop 41.

Thereafter, the automatic adjusting operation described with respect to FIGS. 1 to 4 takes place and, as a consequence thereof, the adjustment for the idle position as well as for the full throttle position is completed. To support the adjusting movement in the direction of arrow 52, the toothed configuration 17 and the countertooth configuration 18 have a symmetrical flank course. The latching element 13 is shorter than the holding element 14 measured in the axial direction 21 of the Bowden cable 3 whereby a complete meshing engagement of the toothed configurations (17, 18) into each other is ensured over a wide adjusting path (c) (FIG. 3).

Figure 6:
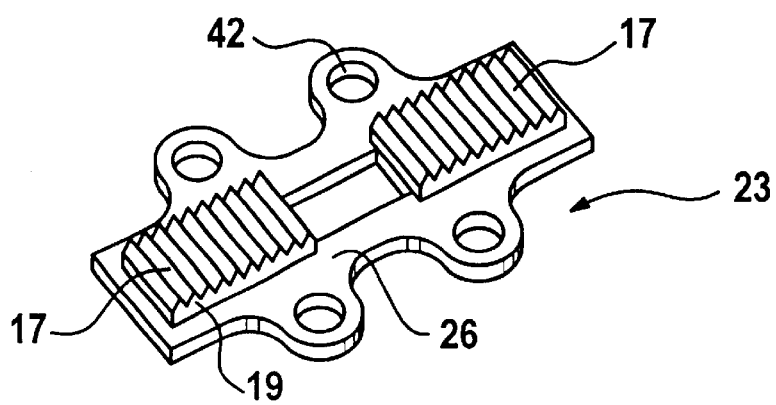
FIG. 6 is a perspective view of the rack in the form of a toothed plate for a guide box of FIG. 5.
Figure 7:
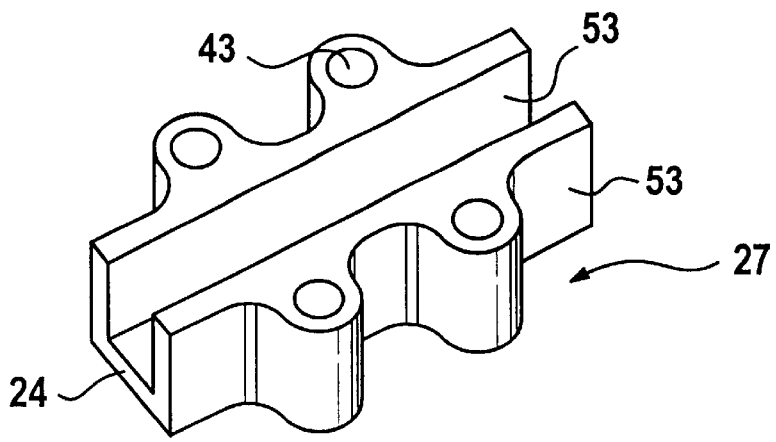
FIG. 7 is a perspective view of an open guide box for a rack of FIG. 6.

The guide box 22 of FIG. 5 is configured as two parts and includes a toothed plate 26 and a spring box 27. These parts and additional individual parts of the adjusting device 12 of FIG. 5 are described in the following. FIG. 6 shows the toothed side of the toothed plate 26. The toothed plate 26 forms the toothed inner wall 23 of the guide box 22 of FIG. 5 and is provided with a toothed configuration 17 which is arranged on both sides of the centered tool opening 25 and comprises a plurality of teeth 19. The toothed plate 26 is provided with four screw lugs 42 in the peripheral region thereof and integral therewith so that the plate 26 can be secured to the spring box 27 of FIG. 7 with threaded fasteners. The spring box 27 likewise has four screw lugs 43 formed as one piece on its side walls 53 via which the spring box 27 is secured to the toothed plate 26 (FIG. 6) to a guide box 22 (FIG. 5) with threaded fasteners and, if required, can be fixed as a holding element also on one of the support positions (8, 9) fixed to the apparatus. The side walls 53 and the wall 24 conjointly define a U-shaped cross section from which, together with the toothed plate 26 (FIG. 6), a tube-shaped box 22 having a rectangular cross section results.

Figure 8:
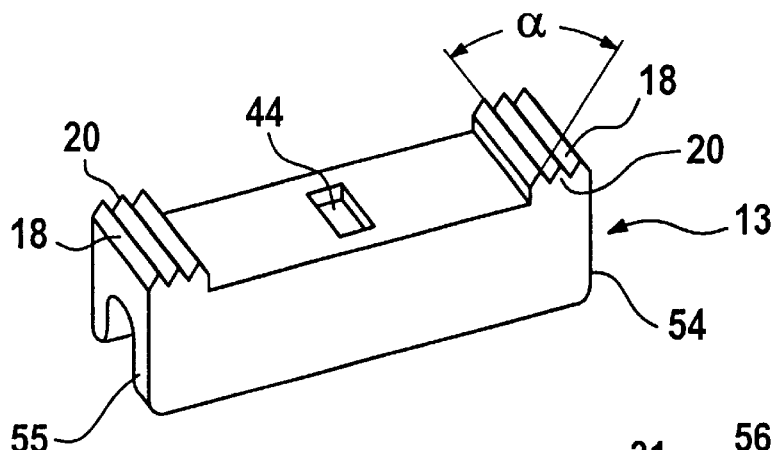
FIG. 8 is perspective view of a latch element for a guide box of FIG. 5.

The latching element 13 shown in FIG. 8 includes a countertooth arrangement 18 which comprises three teeth 20 on each of the two ends (54, 55) of the latching element 13. In this way, the number of teeth 20 is less than the number of teeth 19 of the holding element 14 of FIG. 5. The latching element 13 includes a recess 44 to support the adjusting movement in the direction of arrow 52 by a screwdriver 45 of FIG. 5. The recess 44 is centered between the two ends (50, 55) on the side of the countertoothed arrangement 13. The flank angle a of the toothed configurations (17, 18) can be selected as desired in dependence upon the holding force and amounts, in the embodiment shown, to approximately 90° or less.

Figure 9:
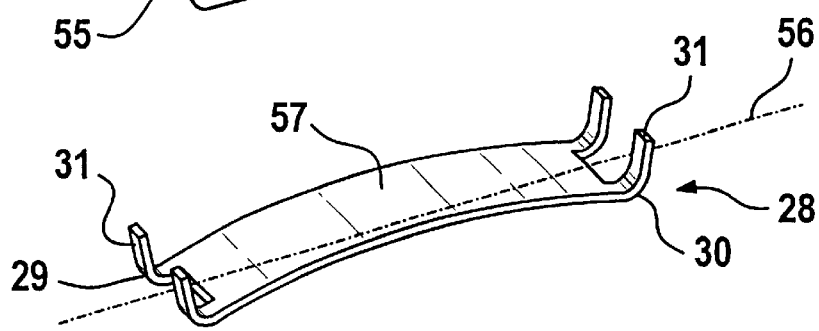
FIG. 9 is a perspective view of a leaf spring for the latch element of FIG. 8.

The leaf spring 28 of FIG. 5 is shown in detail in FIG. 9. The leaf spring is arched along its longitudinal axis 56 so that it lies against the latching element 13 at its center region 57 as shown in FIG. 5. The ends (29, 30) include respective holding angles 31 which engage around the latching element 13 in a form-tight manner. In this way, and because of the pretensioned contact of the ends (29, 30) on the wall 24 (FIG. 5), a sliding movability of the leaf spring 28 on the wall 24 is provided.

In addition to the embodiments shown, embodiments of the invention can also be advantageous wherein the spring element 15 has toothed-shaped bends which can assume the function of the toothed configuration 17 of the holding element 14 or the countertoothed configuration 18 of the latching element 13. Embodiments are also possible wherein the latching element, which is fixed to the Bowden cable casing, is configured to have a tube shape and engages a holding element on the inside with the holding element being fixed to the apparatus.

FIG. 10 shows an alternate embodiment for actuating a throttle flap lever 34 via a throttle lever 33 by means of a throttle pull 37. The throttle pull 37 comprises a Bowden cable casing 4 in which a Bowden cable wire 5 is guided so as to be axially movable. The two ends (6, 7) of the Bowden cable casing 4 are held in respective support locations (8, 9). The actuating path of the throttle lever 33 is delimited by the idle stop 38 and the full throttle stop 39. The actuating path of the throttle flap lever 34 is delimited by the idle stop 40 and the full throttle stop 41. The idle case is shown wherein the throttle lever 33 and the throttle flap lever 34 are in contact with their respective idle stops (38, 40). An adjusting device 12 is provided in the region of the control element end 6 of the Bowden cable casing 4. The holding element 14 of the adjusting device 12 holds the control element end 6 in an out-of-adjustment position (a). The holding element 14 is defined by a cylindrical clamping sleeve 67 which is held to be rotatable about a rotational axis 68 in a control element support location 8. The clamping sleeve 67 has a through bore 69 having a bore axis 70 through which the control element end 6 is passed through. The bore axis 70 is twisted relative to the actuating direction 21 of the throttle pull 37 whereby the control element end 6 is held clamped in the clamping sleeve 67. A pressure spring 16 is provided between the control element end 6 and the corresponding longitudinal stop 10.

FIG. 11 shows the arrangement of FIG. 10 in the full throttle position wherein the throttle lever 33 and the throttle flap lever 34 lie against their respective full throttle stops (39, 41). The clamping sleeve 67 is so rotated that the bore axis 70 is coaxial to the wire 5 whereby the connection between the holding element 14 and the control element end 6 of the Bowden cable casing is loosened. In this way, and because of the contact engagement of the throttle lever 33 on the full throttle stop 39, the control element end 6 is displaced in the direction of arrow 50 relative to out-of-adjustment position (a) shown in FIG. 10 by the adjusting path (c) into the adjustment position (b). In this position, the clamping sleeve 67 can be twisted as shown in FIG. 10 whereby the Bowden cable casing 4 is held clamped and the throttle pull 37 is adjusted.

FIG. 12 shows a brushcutter in accordance with the invention having an engine housing 61 for accommodating the engine 36 shown in FIG. 1 and driving the brushcutter. The engine 36 rotates a rotating cutter tool 64 via a shaft guided in a guide tube 62. The cutting tool 64 is partially covered by a protective hood 65. A steering bar 58 is adjustably attached at a connecting location 63 to the guide tube 62 and is for guiding the cutting tool 64 along the direction 66 of movement. The steering bar includes a handle 59 at one end and a throttle handle 60 at its other end wherein the throttle lever 33 and the adjusting device 12 are mounted. The throttle lever 33 is connected via the throttle pull 37 to the throttle flap lever 34 of the carburetor 35 (FIG. 1) for controlling the power of the engine 36. Respective support locations (8, 9) for the throttle pull 37 are provided in the throttle handle 60 and in the engine housing 61, respectively.

It is understood that the foregoing description is that of the preferred embodiments of the invention and that various changes and modifications may be made thereto without departing from the spirit and scope of the invention as defined in the appended claims.

What is claimed is:

1. A method for adjusting the idle position of a throttle pull of a portable handheld work apparatus driven by an internal combustion engine having a carburetor, the carburetor having a throttle lever and a throttle flap lever, the throttle pull including a Bowden cable having a cable casing and a cable wire axially guided and axially movable in said cable casing, and said Bowden cable connecting said throttle lever and said throttle flap lever to each other, said throttle lever being movable between a first idle stop and a first full throttle stop and said throttle flap lever also being movable between a second idle stop and a second full throttle stop; and, said throttle pull further including an adjusting device mounted on an apparatus-fixed support location and having a holding element; the method comprising the steps of:

moving said throttle flap lever in a direction of full throttle utilizing said throttle lever until one of said levers comes into contact with the full throttle stop corresponding thereto;

loosening an existing connection between said holding element of said adjusting device and one of the two ends of said cable casing;

axially shifting said one end of said cable casing relative to said holding element so far that said throttle lever and said throttle flap lever come into contact engagement with said first and second full throttle stops, respectively;

reestablishing the connection between said holding element and said one end of said cable casing;

moving said throttle lever so far in a direction toward said first idle stop so that said throttle flap lever comes into contact engagement with said second idle stop; and, moving said throttle lever through a lost motion distance to said first idle stop.

2. The method of claim 1, wherein said throttle pull includes: two longitudinal stops and said cable casing is disposed between said longitudinal stops; and, a pressure spring disposed between one of said longitudinal stops and the corresponding one of said ends of said cable casing; and, wherein the method comprises the further step of displacing said cable casing relative to said holding element against the spring force of said pressure spring.

3. The method of claim 2, wherein said one end of said cable casing is in the region of said throttle lever and said adjusting device is in said region of said throttle lever; and, wherein the method comprises the further step of displacing said cable casing with the aid of said adjusting device.

4. The method of claim 3, wherein said adjusting device further includes: a latch element fixed to said one end of said cable casing and said latch element being in engagement with said holding element; and, a spring element pressing said latch element and said holding element against each other under a pretension; and, wherein the method comprises the steps of:

holding said latch element via said holding element at a preadjusted holding force during normal operation; and, to effect the displacement of said cable casing, exceeding said holding force and ratchettedly moving said holding element.

5. The method of claim 4, wherein said latch element includes a set of counter teeth; and, said holding element includes a toothed configuration formed thereon and said toothed configuration includes a plurality of teeth engaging said counter teeth of said latch element; and, the method including the step of making the ratchetted displacement via said toothed configuration.

6. The method of claim 1, comprising the further step of manually loosening the connection between said holding element and one of the ends of said cable casing as required.

7. The method of claim 6, wherein said adjusting device further includes a guide box defining said holding element and said guide box is configured to accommodate said latch element; said guide box having a first wall with a tool opening formed therein and said wall having an inner side on which said tooth configuration is disposed; said guide box having a second wall lying opposite said first wall; and, a spring element disposed between said second wall and said latch element for holding said latch element in meshed contact with said tooth configuration; and, wherein the method comprises the further step of:

passing a work tool through said tool opening; and, pressing said latch element against the spring force of said spring element so far that said toothed configuration and said latch element are no longer in meshing contact engagement with each other.

* * * * *